Patented Sept. 20, 1932

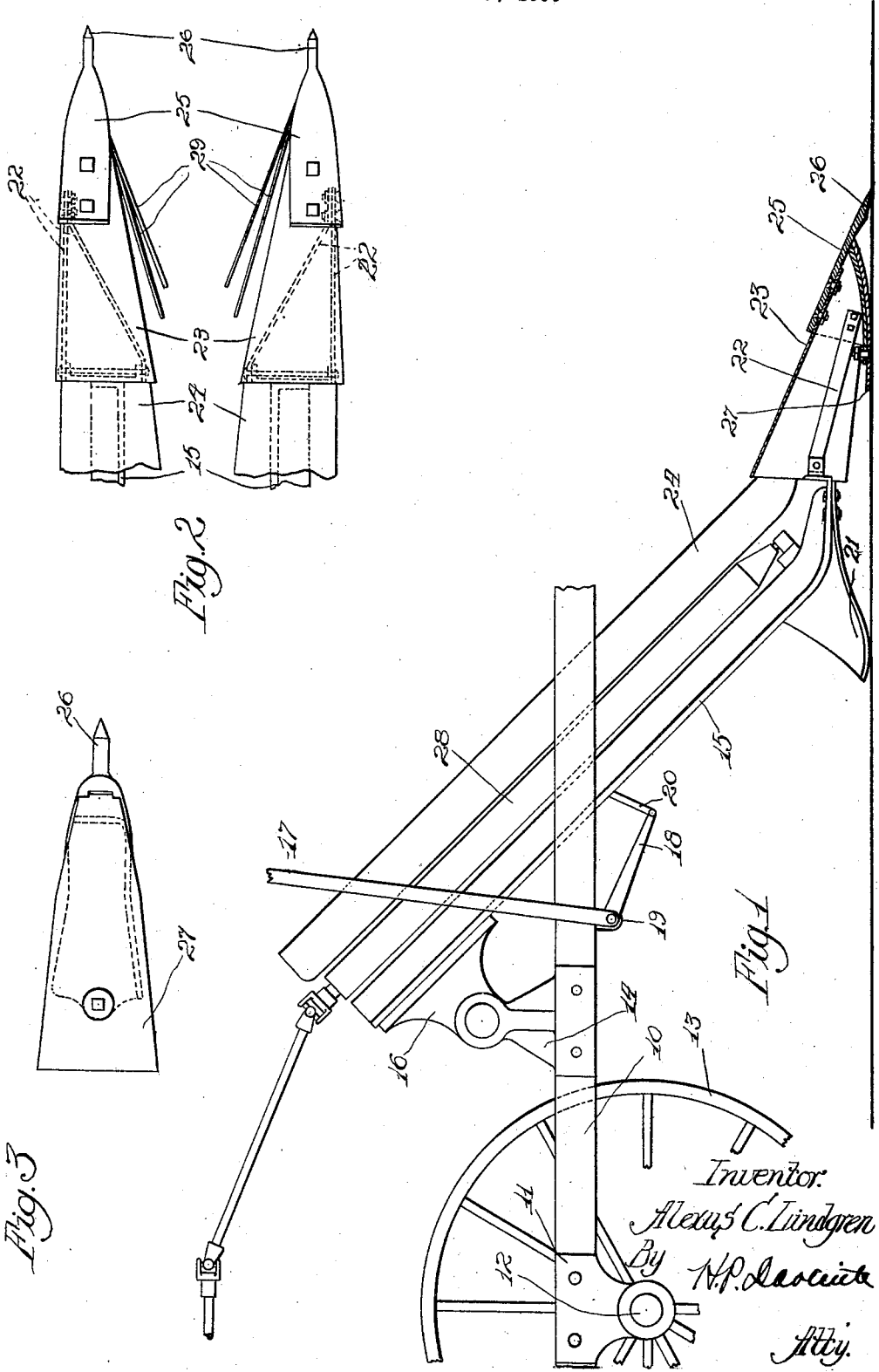

1,878,941

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

CORN PICKER GATHERING POINT

Application filed October 20, 1930. Serial No. 489,725.

This invention relates to improvements in corn pickers. More particularly, it relates to means for lifting stalks and guiding them to the throat of a corn picker.

Corn stalks at the time corn is to be picked are often broken at or near the ground and portions of the stalks are lying on the surface of the ground. Under some conditions the stalks may even be slightly embedded in the soil. Difficulties have been encountered in attempting to devise means for attaching to the front of a picking unit which would lift the stalks and at the same time would not dig into the ground. This is paticularly a problem when the picker units are mounted on a tractor, for example, which has a comparatively long wheel base, which does not allow the picker unit to closely follow the contour of irregular surfaces.

The principal object of the present invention is to devise and construct a floating shoe attachment for the ground engaging end of a picker unit, which will be effective to lift stalks and guide them to the throat of the machine. This object and others, which will be apparent from the detailed description to follow, are accomplished by the particular arrangement illustrated in the drawing, in which:

Figure 1 is a fragmentary view showing certain portions of a picker unit and support therefor and the floating attachment of the invention;

Figure 2 is a top plan view of the forward end of a picker unit, such as shown in Figure 1, with the floating pick-up attachment in position; and, Figure 3 is a bottom plan view of one of the pick-up attachments.

In the drawing, a side frame member 10 of a supporting frame, not shown completely, is supported by a bracket 11 on an axle 12 on which a wheel 13 is mounted. This frame, which may be of any conventional construction, carries a bracket 14 on which a picker unit is pivotally mounted.

The picker unit may also be of any conventional construction having a frame structure consisting in part of bars, such as the angle bar 15. A bearing bracket 16 rigidly attached to the bar 15 of the frame structure is pivotally mounted on the bracket 14. Means are provided for adjusting the picker unit about its pivot point. As shown in the drawing, this means may consist of a lever 17 having an angular extension 18 pivoted on a bracket 19 attached to the side frame member 10. The extension 18 is pivotally connected to a link 20 attached to the frame of the picker unit. The frame of the picker unit extends forwardly downwardly and is provided with a runner 21. The runner is rigidly attached to the frame of the picker unit and extends rearwardly therefrom with a curvature such that it will ride over ridges of substantial height, or depressions in the soil.

At the forward end of the frame in front of the runner 21, a floating pick-up unit is pivotally attached for lifting fallen stalks. It is particularly in this unit in combination with the runner 21 that the novelty of the device resides. The stalk pick-up unit is provided with a frame 22 pivotally attached to the frame of the picker unit on a transverse axis and extending forwardly therefrom. A shield 23 rigidly attached to this frame extends rearwardly and upwardly therefrom to form a guiding shield, as shown in Figure 2. The shield 23 extends slidably over a shield 24 on the picker unit. The construction at each side of the picker unit, which is provided with spaced gathering arms between which the stalks are guided, as is customary in pickers of this type, is exactly the same. In addition to the shield 23, a shoe 25 is attached to the frame of the pick-up unit and to the shield 23. As best shown in Figure 2, the shoe 25 has a flattened portion extending forwardly, which is tapered to a rod-like point 26. This point 26, as will be hereinafter described, is designed to engage the surface of the soil at all times normally making a furrow therein, except where depressions are encountered.

As shown in Figure 3, and in section in Figure 1, a runner member 27 is attached to the under side of the pick-up unit. This runner member is shaped to extend forwardly upwardly with a smooth curve and is secured to the under side of the shoe 25. As shown in Figure 1, the point 26 of the shoe extends vertically below the lower surface of the runner member 27.

It will be noted that a husking roll 28 is shown in the drawing as well as means for driving said roll. This showing is fragmentary and is merely to show the relative position of said elements on the picking unit for the purpose of better illustrating the invention which resides, as previously stated, in the pick-up unit.

The functioning of the device is obvious from the description given above. The runner 21 rides along on the surface of the soil, maintaining the forward end of the picker unit frame in spaced relation to the surface of the soil. The pick-up, which is mounted in a floating relation with respect to the picker unit, also rides along the surface of the soil, its rear portion being gaged by the runner on the picker unit and its forward end being held in spaced relation to the soil by the runner member 27. It will thus be understood that the pick-up unit will follow the ground with a substantially parallel movement with respect to the surface thereof. The point 26 of the shoe 25, extending downwardly below the runner 27, engages the soil and normally plows a small furrow along the surface. The point is of such size that only a small amount of force is necessary to push it through any obstruction which it might encounter. As said point runs beneath the surface of the soil, it is obvious that any stalks, even though they may be slightly embedded in the soil, are lifted and slide upwardly over the shield 23 and are guided into the gathering arms of the picker unit by the shield 24. Rods 29 of a conventional construction are also attached to the floating pick-up units to assist in guiding the stalks into the throat of the picker.

It is to be understood that applicant has shown only a preferred embodiment of his device and that he claims as his invention all modifications falling within the scope of the appended claim.

What is claimed as new is:

In a harvesting device, a frame structure adapted to be mounted on a supporting frame and a pick-up unit floatingly mounted at the forward end of said structure, said unit being provided with a runner member adapted to operate along the surface of the ground, a soil penetrating member extending forwardly and downwardly from said unit, and stalk deflecting rods extending laterally from one side thereof.

In testimony whereof I affix my signature.

ALEXUS C. LINDGREN.